May 26, 1964
R. E. RHODES
3,134,942
MULTIPLE PROBE RESISTIVITY MEASURING APPARATUS
WITH WORKPIECE SUPPORT MEANS
Filed Dec. 13, 1960
2 Sheets-Sheet 1
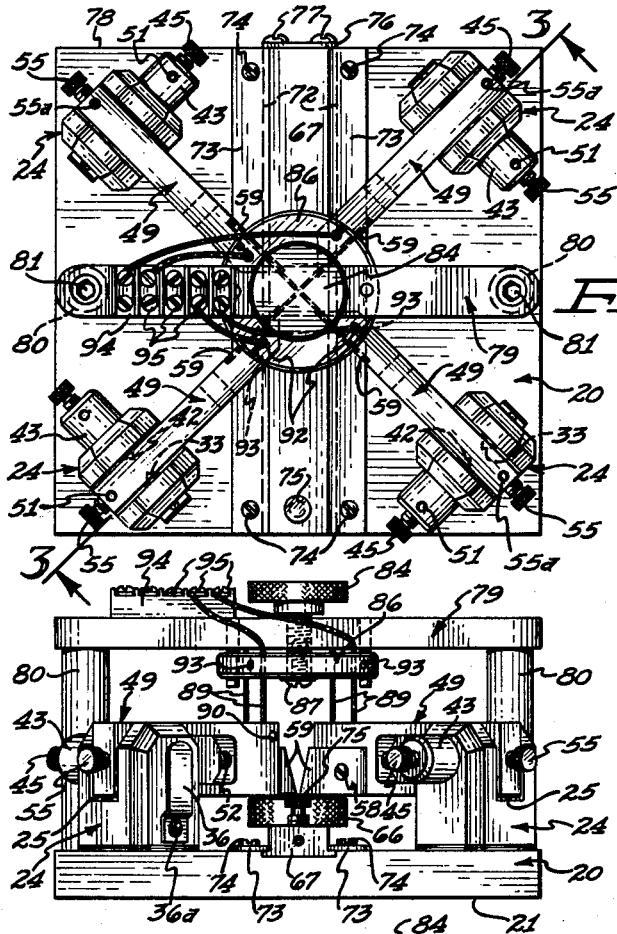
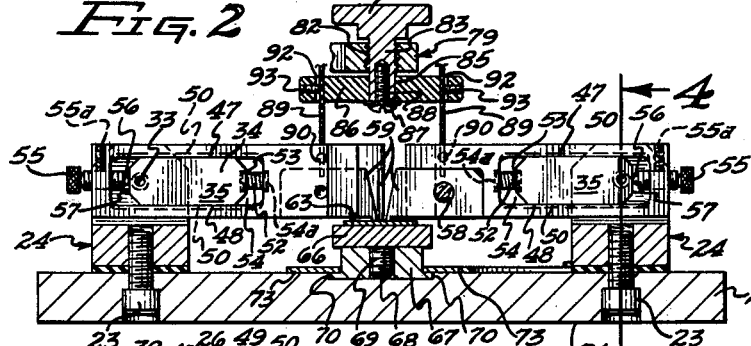
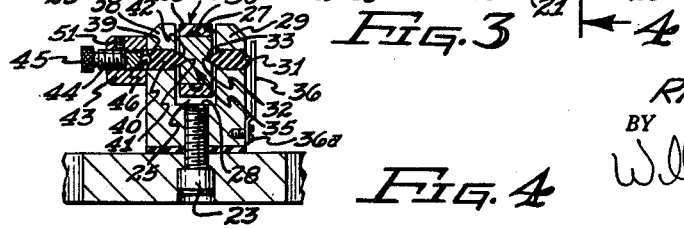
INVENTOR.
RICHARD E. RHODES.
BY
Willard S. Gount
ATTORNEY.

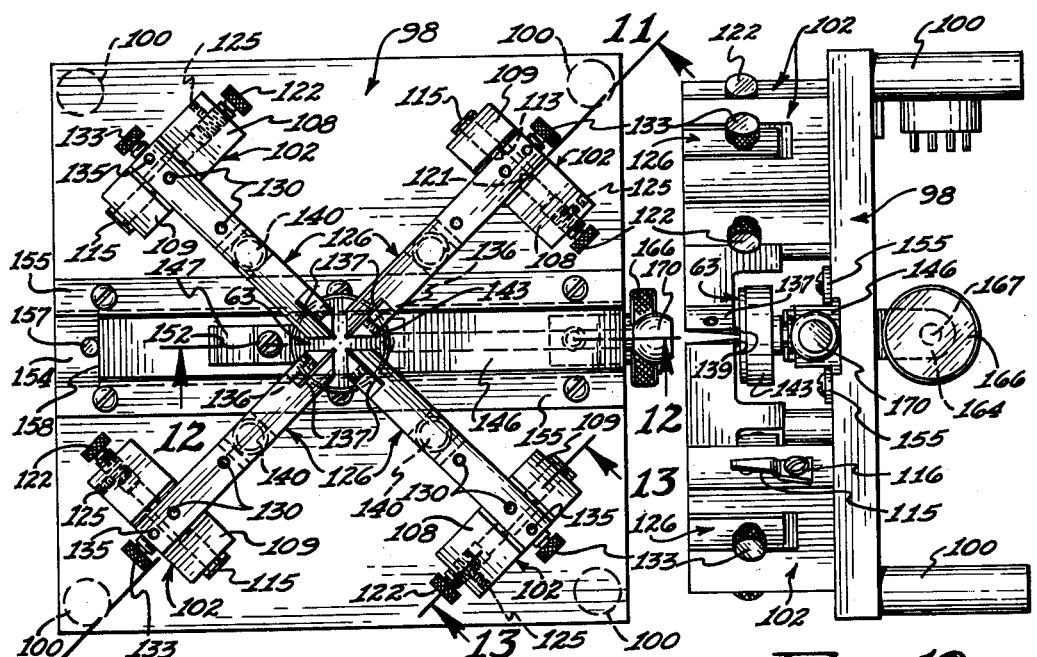

United States Patent Office 3,134,942
Patented May 26, 1964

3,134,942
MULTIPLE PROBE RESISTIVITY MEASURING APPARATUS WITH WORKPIECE SUPPORT MEANS
Richard E. Rhodes, 4814 E. Virginia, Phoenix, Ariz.
Filed Dec. 13, 1960, Ser. No. 75,533
6 Claims. (Cl. 324—62)

This invention pertains to a resistivity measuring apparatus and is particularly directed to a device for measuring the resistivity between a plurality of selected accurately spaced points on a workpiece to be tested.

One of the objects of this invention is to provide a device for measuring the resistivity between a plurality of selected points on a workpiece surface.

Another object is to provide a device as aforementioned in which the points of contact with the workpiece surface can be easily and accurately positioned.

A further object is to provide a device as aforementioned in which the workpiece may be easily and quickly moved to and from a testing position in the device and the contact probes quickly and accurately engaged and disengaged with the work surface to be tested.

It is also an object of this invention to provide a resistivity measuring apparatus in which a plurality of probing contact needles may be readily adjusted to any desired configuration of contact with the work surface to be checked.

Further features and advantages of this invention will appear from a detailed description of the drawings in which:

FIG. 1 is a plan view of one embodiment of a resistivity measuring apparatus incorporating the features of this invention.

FIG. 2 is a side elevation of the apparatus shown in FIG. 1.

FIG. 3 is a section on the line 3—3 of FIG. 1.

FIG. 4 is a fragmentary sectional view on the line 4—4 of FIG. 3.

FIG. 5 is a diagrammatic view showing a plurality of probe needles arranged in a straight line.

FIG. 6 is an enlarged fragmentary view particularly showing the probe needle contact points engaging the workpiece surface.

FIG. 7 is an elementary circuit diagram showing the electrical apparatus used in connection with the probe needles.

FIG. 8 is a view showing the needles arranged in a square or diamond spacing position for engaging the workpiece surface.

FIG. 9 is a plan view of a modification of the device shown in FIG. 1.

FIG. 10 is a side elevation of the device shown in FIG. 9.

FIG. 11 is a section on the line 11—11 of FIG. 9.

FIG. 12 is an enlarged fragmentary sectional view on the line 12—12 of FIG. 9.

FIG. 13 is an enlarged fragmentary view on the line 13—13 of FIG. 9.

As an example of one embodiment of this invention there is shown a resistivity measuring device comprising a base plate 20 having a bottom surface 21 and a top surface 22. Fixed to the top surface 22 of the plate 20 by suitable screws 23 are the upstanding pedestals 24, each of which is bifurcated at their upper ends to form slots 25 defined by the sides 26 and 27 and the bottom 28. In the portion 29 of each of the pedestals 24 is formed a horizontal bore 30 in which is axially slidable a pivot pin 31 formed of insulative plastic material having a cone pointed end 32 which engages in a mating conical pivot bearing 33 formed in the side 34 of the pivot block 35. A flat spring 36, FIG. 4, is fixed by a screw 36a at its lower end to the pedestal 24. This flat spring engages a rounded outer end 37 of the pivot pin 31 to normally yieldingly urge the pivot pin 31 into engagement with the pivot block 35.

In the portion 38, FIG. 4, of the pedestal 24 is formed a bore 39 in horizontal alignment with the bore 30 in the portion 29. Axially slidable in the bore 39 is a pivot pin 40 of insulative material similar to pivot pin 31 having a cone pointed end 41 engaging in a mating conical pivot bearing 42 in the side 43 of the pivot block 35. A threaded bushing 43 is fixed to the portion 38 and has a threaded bore 44 in alignment with the bores 30 and 39 in which operates the adjusting screw 45. The inner end of the adjusting screw 45 is concave and engages a rounded outer end 46 of the pivot pin 40. It will be noted that the pivot block is narrower than the slot 26—27 so that by adjusting the screw 45 in conjunction with the spring 36 that the pivot blocks may be precisely positioned sidewise in the slot 25 on the pedestal 24, the pivot block always being spaced from the sides 26 and 27 of the slot so as to be electrically insulated from the pedestal. A suitable lock screw 51 in the bushing 43 serves to secure the adjusting screws in desired adjusted position.

Slidably mounted on the top and bottom surfaces 47 and 48 of the pivot blocks are the contact point arms 49 which are confined laterally on the pivot blocks 35 by suitable guideways 50. A compression spring 52 engaging the inner end 53 of the pivot block 35, FIG. 3, and the forward end 54a of the slot 54 in the contact point arm 49 normally yieldingly urges the arms 49 radially inwardly toward each other. An adjusting screw 55 is threaded in the outer end of the contact point arm 49 and has its inner end 56 abuttingly engaging the outer end 57 of the pivot block 35 to oppose the compression spring 52. Thus, by operating screw 55 relative radial in-and-out positioning of the contact point arms may be accomplished. A suitable lock screw 55a may be utilized to lock the adjusting screws 55 in desired adjusted position.

Demountably fixed to the inner ends of the contact point arms 49 by suitable screws 58 are the contact point elements 59 which terminate in downwardly and inwardly sloping edges 60, FIG. 6, at the lower ends of which are formed suitable work contacting points 61 adapted to engage the upper surface 62 of a workpiece 63 to be tested. The workpiece is supported by its lower surface 64 on the work supporting surface of the work table 66. The work table in this arrangement is fixed to the cross slide 67 by means of its integral downwardly extending threaded stem 68 which is threaded into a mating threaded bore 69 formed in the cross slide 67. The cross slide has longitudinally extending flanges 70 adjacent its bottom surface 71. The cross slide 67 is arranged to slide longitudinally in a groove 72 formed in the top 22 of the base plate 20 and suitable gibs 73 secured to the base plate 20 by screws 74 serve to guide the cross slide 67 in the slot 72. A pull knob 75 is provided on the cross slide to facilitate manual longitudinal movement of the cross slide and the work table 66 to and from working position while a stop plate 76 secured to the side 78 of the base plate 20 by screws 77 serves to limit the inward travel of the cross slide to position the work table 66 and a workpiece 63 there in proper position under the contact points 61.

An elevating device is provided for vertically relatively moving the contact points with respect to the surface 62 of the workpiece to be checked so that the contacts 61 may be removed from the workpiece as it is moved to and from working position by the manipulation of the cross slide 67. In the arrangement shown in FIGS. 1, 2 and 3, there is provided a cross bar 79 fixed to the tops of the upstanding posts 80 by suitable screws 81, the posts 80 in turn being rigidly fixed at their lower ends to the top surface 22 of the base plate 20. The cross bar extends substantially at right angles to the cross slide 67 and over the inner ends of the contact point arms and their contact points and over the work table 66 and a workpiece 63 thereon. The cross bar 79 is provided with a threaded bore 82 in which is carried the threaded stem 83 of the contact point elevating thumb screw 84. The lower end of the stem 83 has a bearing surface 85 upon which is journaled the lifting disc 86 which is made of suitable plastic insulative material. A screw 87 threaded at 88 into the lower end of the stem 83 has a washer clamped by the screw 87 to the lower end of the stem 83 so as to confine the lifting disc 86 against relative downward axial movement on the bearing portion of the stem 83 so that raising and lowering of the thumb screw by rotating it in the threaded bore 82 in the cross bar 79 effect similar vertical movements, without rotation therein, of the lifting disc 86. Lifting wires 89 are suitably fixed directly in electrical contact with the contact point arms 49 by the binding post screws 90 engaging these wires 89 in suitable vertical receiving holes 91 formed in the top inner ends of the contact point arms 49. The wires 89, preferably of a highly flexible braided structure, extend upwardly through the holes 92 formed in the lifting disc 86 and are locked therein by suitable binding screws 93 so that as the disc 86 is raised and lowered by the elevating thumb screw 84 the inner ends and contact points 61 may be moved up and down relative to the workpiece surface 62. The electrical wires or conductors may be attached to the binder screws 95 of a terminal block 94 suitably fixed to the cross bar 79. A suitable probing circuit such as shown by the battery 96, FIG. 7, and the indicating meter 97 may be applied to the binder screws to detect the resistivity between the various contact points 61 when in contact with the surface 62 of the workpiece 63. The gravity weight down pressure provides uniform pressure of the contacts 61 on the work surface 62 when the thumb screw is screwed down to allow the wires 89 to slack between the disc and the arms to thus give precise and uniform operating conditions for measuring the electrical characteristics of the workpiece.

It will be noted that the probing contact points are shown, in FIGS. 1, 2 and 3, arranged to contact the workpiece surface in a square, box or diamond pattern as illustrated in FIG. 8. However, because of the lateral adjustment afforded by the adjusting screws 45 and the radial adjustment provided by the adjusting screws 55, practically any variety of contact pattern may be provided. For example, in FIG. 5, is shown a straight line arrangement of all of the contact points in the same plane. This may be readily accomplished by the appropriate adjustment of the screws 45 and 55 as described.

In the modification shown in FIGS. 9 through 13 inclusive, there is provided a resistivity measuring device having a base plate 98 to the bottom 99 of which is fixed the downwardly extending legs 100. On the top surface 101 of the base plate 98 are provided a plurality of radially disposed contact point supporting devices each comprising an upstanding pedestal 102 rigidly fixed to the base plate by suitable screws 103, as best seen in FIG. 13. A slot 104 defined by the sides 105 and 106, and the bottom 107 so as to provide upstanding pedestal portions 108 and 109. In portion 109 is formed a horizontal bore 110 in which is axially slidable a pivot pin 111 formed of insulative plastic material having a cone point 112 which engages in a mating conical pivot bearing 113 formed in the side of the pivot block 114. A flat spring 115 is fixed by a suitable screw 116 at its lower end to the pedestal 102. This flat spring 115 engages the outer end 117 of the pivot pin 111 to normally yieldingly urge the pivot pin 111 into engagment with the pivot block 114.

In the pedestal portion 108 of the pedestal 102 is formed a bore 118 in horizontal alignment with the bore 110 in the portion 109. Axially slidable in the bore 118 is a pivot pin 119 having a cone point 120 engaging in a mating conical pivot bearing 121 in the side of the pivot block 114 opposite the conical pivot bearing 113. An adjusting screw 122 is threadedly mounted at 123 in the outer threaded end of the bore 118. The inner end 124 of the adjusting screw 122 engages the outer end of the pivot pin 119. It will be noted that the pivot block is narrower than the slot 104 so that by adjusting the thumb screw 122 in conjunction with the yielding spring 115 that the pivot block 114 may be precisely positioned sidewise or laterally in the slot 104 on the pedestal 102, the pivot block 114 always being spaced from the sides 105 and 106 of the slot 104 so as to be electrically insulated from the pedestal and base. A suitable lock screw 125 in the pedestal portion 108 serves to secure the adjusting screw 122 in desired adjusted position.

Contact point arms 126 have guide rods 127 fixed therein which are carried in the V-grooves 128 formed in the bottom of the pivot blocks while bearing balls 129 backed up by adjusting screws 130 in the contact point arms 126 engage in the V-grooves 131 in the top of the pivot blocks 114. A compression spring 132 engaging between the pivot block 114 and the contact point arm 126 serves to normally yieldingly urge the arms 126 radially inwardly toward each other, as best seen in FIGS. 9 and 11. An adjusting screw 133 is threaded in the outer end of the contact point arm 126 and has its inner end 134 abuttingly engaging the outer end of the pivot block 114 to oppose the compression spring 132. Thus, by operating thumb screws 133 relative radial in-and-out positioning of the contact arms may be accomplished. Suitable lock screws 135 may be utilized to lock the adjusting screws 133 in desired adjusted position. Demountably fixed to the inner ends of the contact point arms 126 by suitable screws 136 are the contact point elements 137 which terminate in downwardly and inwardly sloping edges 138 at the lower ends of which are formed suitable work contacting points 139 which are adapted to engage the upper surface 62 of a workpiece 63 to be tested.

In the arrangement of FIGS. 9 to 13, the contact point arms 126 are limited in downward swinging movement about the pivot pins 111 and 119 by upstanding stop pins 140 of insulative material fixed in the top surface 101 of the base plate 98, the upper ends 141 of which abuttingly engage the bottom stop surface 142 of the contact point arms 126. In this adaptation the workpiece 63 is raised and lowered to-and-from contact position with the contact points 61 of the device as well as horizontally radially of the contact points. To this end there is provided a work table 143, FIG. 12, having a downwardly extending stem 144 which is slidingly mounted for vertical movement in a bore 145 formed in the cross slide 146. A flat spring 147 has one end 148 fulcrumed against the top surface 149 of the cross slide 146 and its other end bifurcated at 150 and received in an annular groove 151 in the stem 144. A tensioning screw 152 extending through an intermediate portion of the spring 147 and threaded at 153 serves to apply tension on the spring 147 to yieldingly urge the stem 144 and work table 143 relatively downwardly of the cross slide 146. The cross slide 146 is arranged to slide in a groove 154 in the top surface 101 of the base plate 98 and held in proper operating condition therein by suitable gibs 155 secured to the top 101 of the base plate, the gibs overlapping the flanges 156 of the cross slide to secure the same to the plate 98. A stop pin 157 fixed in the plate 98 in the slot 154 is engaged by the end 158 of the cross slide to accurately position the work table 143 and workpiece 63 in testing position. Formed in the base plate 98 is a bore 159 of the same diameter as the bore 145 in the cross slide 146 and so positioned as to be in alignment with the bore 145 when the cross slide is stopped by the pin 157 in testing position. An interlock pin 160 is axially slidably mounted in the bore 159 and is adapted to enter the bore 145 when bores 145 and 159 are aligned. When the interlock pin is in both bores, as shown in FIG. 12, the cross slide is locked in testing position to the base plate 98. The interlock pin 160 and the stem 144 and work table are vertically reciprocated when bores 145 and 149 are in alignment by an eccentric cam 161 having an eccentric periphery engaging the lower end of the interlock pin 160. The cam 161 is fixed on an operating shaft 167 journaled in suitable bearings 163 carried in brackets 164 fixed to the underside 99 of the plate 98 by screws 165. An operating knob 166 is fixed to the outer end of the operating shaft 167 whereby it may be rotated to cause the cam 161 to vertically reciprocate the interlock pin 160, the spring 147 yieldingly holding the lower end of the stem 144 at all times in contact with the top of the interlock pin so that the work table may be reciprocated vertically by rotating the knob 166.

When the knob is rotated so that the high cam point engages the interlock pin 160, this interlock pin enters the bore 145 locking the cross slide in testing position of the work table. At the same time, the work table is raised, bringing the top surface 62 of the workpiece up against the contact points 139 which lift the contact point arms 126 up from contact with stop surface 62 to slightly raise the arms off of the stop pin upper end surfaces 141 for making the resistivity tests. When knob 166 is rotated to present the low point of the cam 161 under the interlock pin 160, the top of the interlock pin drops below the bottom surface 168 of the cross slide 146 while the lower end of the stem 144 is stopped just above the bottom surface 168 of the cross slide by the shoulder 169 of the stem 144 engaging the top surface 149 of the cross slide 146. By this operation the workpiece 63 on the work table 143 is dropped below the contact points 139 with the arm 126 again resting, free of the workpiece, on the stop pins 140 while at the same time the cross slide is now free to be pulled out by the knob 170 to withdraw the workpiece out from under the contact points 61 and the arms 126 for loading and unloading the workpieces on the work table. Suitable flexible electrical conductors 171 passing up through the pins 140 and connected to the contact point arms 126 may be connected to appropriate electrical indicating devices as shown in FIG. 7 for determining the resistivity of the workpiece.

While the apparatus herein disclosed and described constiutes a preferred form of the invention, it is also to be understood that the apparatus is capable of mechanical alteration without departing from the spirit of the invention and that such mechanical arrangement and commercial adaption as fall within the scope of the appendent claims are intended to be included herein.

Having thus fully set forth and described this invention what is claimed and desired to be obtained by United States Letters Patent is:

1. A resistivity measuring device comprising in combination:
   (a) a horizontal base plate,
   (b) a plurality of contact point arms radially outwardly disposed relative to the center of said base plate and pivotally mounted on said base plate at circumferentially spaced positions around said center so as to swing in planes perpendicular to said base plate and intersecting at substantially said center of said base plate,
   (c) downwardly projecting contact points on the inner ends of said arms,
   (d) a work table,
   (e) means for supporting said work table on said base plate under said contact points,
   (f) means on said base plate for effecting vertical movement of said arms and contact points relative to said work table and an indicating meter and a source of electrical power connectable in series between pairs of said contact points.

2. A resistivity measuring device comprising in combination:
   (a) a horizontal base plate,
   (b) a plurality of contact point arms radially outwardly disposed relative to the center of said base plate and pivotally mounted on said base plate at circumferentially spaced positions around said center so as to swing in planes perpendicular to said base plate and intersecting at substantially said center of said base plate,
   (c) downwardly projecting contact points on the inner ends of said arms,
   (d) a work table,
   (e) means for supporting said work table on said base plate under said contact points,
   (f) means on said base plate for effecting vertical movement of said arms and contact points relative to said work table,
   (g) further means on said base plate for moving said work table horizontally on said base plate relative to said contact points on the inner ends of said arms and an indicating meter and a source of electrical power connectable in series between pairs of said contact points.

3. A resistivity measuring device comprising in combination:
   (a) a horizontal base plate,
   (b) a plurality of contact point arms radially outwardly disposed relative to the center of said base plate and pivotally mounted on said base plate at circumferentially spaced positions around said center so as to swing in planes perpendicular to said base plate and intersecting at substantially said center of said base plate,
   (c) downwardly projecting contact points on the inner ends of said arms,
   (d) a work table,
   (e) means for supporting said work table on said base plate under said contact points,
   (f) means on said base plate for effecting vertical movement of the inner ends of said contact point arms and said work table,
   (g) means on said base plate for horizontally moving said work table radially of the center of said base plate relative to said contact points on the inner ends of said arms,
   (h) interlock means between said base plate and said last mentioned means to prevent said radial movement of said work table when positioned under and in contact with said contact points and an indicating meter and a source of electrical power connectable in series between pairs of said contact points.

4. A resistivity measuring device comprising in combination:
   (a) a horizontal base plate,
   (b) a plurality of contact point arms radially outwardly disposed relative to the center of said base plate and pivotally mounted on said base plate at circumferentially spaced positions around said center so as to swing in planes perpendicular to said base plate and intersecting at substantially said center of said base plate,
   (c) means interconnected between said base plate and said arms for effecting horizontal radial in-and-out movement of said arms relative to said base plate center,
   (d) downwardly projecting contact points on the inner ends of said arms,
   (e) a work table having a horizontal top surface for supporting a workpiece to be tested,
   (f) means on said base plate for moving said work table radially of the center of said base plate to and from a position under said contact point,
   (g) means on said base plate for vertically raising and lowering the inner ends of said arms to place on and remove said contact points from a workpiece on the horizontal work supporting top surface of said work table and an indicating meter and a source of electrical power connectable in series between pairs of said contact points.

5. A resistivity measuring device comprising in combination:
 (a) a horizontal base plate,
 (b) a plurality of contact point arms radially outwardly disposed relative to the center of said base plate and pivotally mounted on said base plate at circumferentially spaced positions around said center so as to swing in planes perpendicular to said base plate and intersecting at substantially said center of said base plate,
 (c) means interconnected between said base plate and said arms for effecting horizontal radial in-and-out movement of said arms relative to said base plate center,
 (d) downwardly projecting contact points on the inner ends of said arms,
 (e) a work table having a horizontal top surface for supporting a workpiece to be tested,
 (f) means on said base plate for moving said work table radially of the center of said base plate to and from a position under said contact point,
 (g) means on said base plate for vertically moving said work table when under said contact points at the center of said base plate to engage and disengage said contact points with a workpiece on said top surface of said work table and an indicating meter and a source of electrical power connectable in series between paids of said contact points.

6. A resistivity measuring device comprising in combination:
 (a) a horizontal base plate,
 (b) a plurality of contact point arms radially outwardly disposed relative to the center of said base plate and pivotally mounted on said base plate at circumferentially spaced positions around said center so as to swing in planes perpendicular to said base plate and intersecting at substantially said center of said base plate,
 (c) means interconnected between said base plate and said arms for effecting horizontal radial in-and-out movement of said arms relative to said base plate center,
 (d) downwardly projecting contact points on the inner ends of said arms,
 (e) a work table having a horizontal top surface for supporting a workpiece to be tested,
 (f) means on said base plate for moving said work table radially of the center of said base plate to and from a position under said contact point,
 (g) means on said base plate for vertically moving said work table when under said contact points at the center of said base plate to engage and disengage said contact points with a workpiece on said top surface said work table,
 (h) an interlock device on said base plate operable by said last mentioned means to prevent radial movement of said work table when said work table has been moved to engage a workpiece thereon with said contacts of said contact point arms and an indicating meter and a source of electrical power connectable in series between pairs of said contact points.

References Cited in the file of this patent

FOREIGN PATENTS 887,651  France _____ Nov. 19, 1943